US006966747B2

(12) United States Patent
Taylor et al.

(10) Patent No.: US 6,966,747 B2
(45) Date of Patent: Nov. 22, 2005

(54) WIND TURBINE HAVING AIRFOILS FOR BLOCKING AND DIRECTING WIND AND ROTORS WITH OR WITHOUT A CENTRAL GAP

(76) Inventors: Ronald J. Taylor, 1169 Long Valley Rd., Cheyenne, WY (US) 82009; Scott J. Taylor, 3210 Holland Ct., Cheyenne, WY (US) 82009

( * ) Notice: Subject to any disclaimer, the term of this patent is extended or adjusted under 35 U.S.C. 154(b) by 0 days.

(21) Appl. No.: 10/831,515

(22) Filed: Apr. 23, 2004

(65) Prior Publication Data

US 2004/0219019 A1 Nov. 4, 2004

Related U.S. Application Data

(60) Provisional application No. 60/467,773, filed on Apr. 30, 2003.

(51) Int. Cl.[7] ................................................. F03D 3/04
(52) U.S. Cl. ........................... 415/1; 415/186; 415/191; 415/211.2; 415/908; 416/197 A; 416/DIG. 4; 416/DIG. 9
(58) Field of Search .................. 415/4.2, 4.4, 186, 415/191, 211.2, 908, 1; 416/197 A, 197 B, 416/DIG. 4, DIG. 9; 290/44, 55

(56) References Cited

U.S. PATENT DOCUMENTS

| 2,812,823 A | * | 11/1957 | Oviedo ......................... 415/129 |
| 2,896,882 A | | 7/1959 | Nelson |
| 3,876,925 A | | 4/1975 | Stoeckert |
| 3,895,882 A | | 7/1975 | Moyer |
| 3,922,012 A | | 11/1975 | Herz |
| 3,986,786 A | | 10/1976 | Sellman |
| 4,031,405 A | | 6/1977 | Asperger |
| 4,037,983 A | | 7/1977 | Poeta |
| 4,047,833 A | | 9/1977 | Decker |
| 4,057,270 A | | 11/1977 | Lebost |
| 4,070,131 A | | 1/1978 | Yen |
| 4,079,264 A | | 3/1978 | Cohen |
| 4,084,918 A | | 4/1978 | Pavlecka |
| 4,088,419 A | | 5/1978 | Hope et al. |
| 4,115,027 A | | 9/1978 | Thomas |
| 4,115,028 A | | 9/1978 | Hintze |
| 4,116,581 A | | 9/1978 | Bolie |
| 4,119,863 A | | 10/1978 | Kelly |
| 4,132,282 A | | 1/1979 | Sparks |
| 4,154,556 A | | 5/1979 | Webster |
| 4,156,580 A | | 5/1979 | Pohl |

(Continued)

OTHER PUBLICATIONS

Volta Torrey, Wind-Catchers American Windmills of Yesterday adn Tomorrow.

(Continued)

*Primary Examiner*—Ninh H. Nguyen
(74) *Attorney, Agent, or Firm*—Cochran Freund & Young LLC; William W. Cochran

(57) ABSTRACT

A wind turbine device of increased efficiency is comprised of a set of fixed airfoils that direct wind into a rotor having a plurality of blades. The fixed airfoils may extend to the ground to increase the amount of wind directed into the rotor and may be manufactured from concrete. The rotor blades have a vented portion near the axis of rotation that has been found to increase efficiency for certain blade geometries. For other blade geometries, increased efficiency is observed with no gap at the axis of rotation. The rotor may also be manufactured from composite materials to increase strength while decreasing the moment of inertia for the rotor.

16 Claims, 13 Drawing Sheets

U.S. PATENT DOCUMENTS

| | | |
|---|---|---|
| 4,164,382 A | 8/1979 | Mysels |
| 4,174,923 A | 11/1979 | Williamson |
| 4,204,796 A | 5/1980 | Pack, Jr. |
| 4,234,289 A | 11/1980 | Lebost |
| 4,236,866 A | 12/1980 | Zapata Martinez |
| 4,260,325 A | 4/1981 | Cymara |
| 4,270,056 A | 5/1981 | Wright |
| 4,278,896 A | 7/1981 | McFarland |
| 4,288,200 A | 9/1981 | O'Hare |
| 4,295,783 A | 10/1981 | Lebost |
| 4,309,146 A | 1/1982 | Hein et al. |
| 4,423,368 A | 12/1983 | Bussiere |
| 4,452,562 A | 6/1984 | Hsu |
| 4,457,666 A | 7/1984 | Selman, Jr. |
| 4,474,529 A | 10/1984 | Kinsey |
| 4,486,143 A | 12/1984 | McVey |
| 4,490,232 A | 12/1984 | Lapeyre |
| 4,496,848 A | 1/1985 | Binder |
| 4,551,631 A | 11/1985 | Trigilio |
| 4,575,311 A | 3/1986 | Wood |
| 4,606,697 A | 8/1986 | Appel |
| 4,717,832 A | 1/1988 | Harris |
| 4,830,570 A | 5/1989 | Benesh |
| 4,838,757 A * | 6/1989 | Benesh ................ 415/4.4 |
| 4,843,249 A | 6/1989 | Bussiere |
| 4,890,976 A | 1/1990 | Janson |
| 4,960,363 A | 10/1990 | Bergstein |
| 4,979,871 A | 12/1990 | Reiner |
| 5,020,967 A | 6/1991 | Gual et al. |
| 5,037,268 A | 8/1991 | Fenlon |
| 5,038,049 A | 8/1991 | Kato |
| 5,126,584 A | 6/1992 | Ouellet |
| 5,133,637 A | 7/1992 | Wadsworth |
| 5,163,813 A | 11/1992 | Schlenker |
| 5,203,672 A | 4/1993 | Wolf |
| 5,246,342 A | 9/1993 | Bergstein |
| 5,269,647 A | 12/1993 | Moser |
| 5,280,827 A | 1/1994 | Taylor et al. |
| 5,287,004 A | 2/1994 | Finley |
| 5,313,103 A | 5/1994 | Hickey |
| 5,333,996 A | 8/1994 | Bergstein |
| 5,336,933 A | 8/1994 | Ernster |
| 5,380,149 A | 1/1995 | Valsamidis |
| 5,386,146 A | 1/1995 | Hickey |
| 5,391,926 A | 2/1995 | Staley et al. |
| 5,454,694 A | 10/1995 | O'Dell |
| 5,463,257 A | 10/1995 | Yea |
| 5,503,525 A | 4/1996 | Brown et al. |
| 5,553,996 A | 9/1996 | Farrar |
| 5,844,324 A | 12/1998 | Spriggle |
| 5,852,331 A | 12/1998 | Giorgini |
| 5,895,201 A | 4/1999 | Huovinen |
| 6,000,907 A | 12/1999 | Bic |
| 6,015,258 A | 1/2000 | Taylor |
| 6,083,382 A | 7/2000 | Bird |
| 6,109,863 A | 8/2000 | Milliken |
| 6,113,350 A | 9/2000 | Liu |
| 6,138,781 A | 10/2000 | Hakala |
| 6,158,953 A | 12/2000 | Lamont |
| 6,191,496 B1 | 2/2001 | Elder |
| 6,309,172 B1 | 10/2001 | Gual |
| 6,406,251 B1 | 6/2002 | Vauthier |
| 6,448,669 B1 | 9/2002 | Elder |
| 6,538,340 B2 | 3/2003 | Elder |
| 2002/0192069 A1 | 12/2002 | Newman |
| 2003/0026684 A1 | 2/2003 | Bohn |

OTHER PUBLICATIONS

James Torginon, A Windcharger For The Attic, Mechanix Illustrated, Mar. 1976.

International Search Report dated Mar. 14, 2005.

* cited by examiner

US 6,966,747 B2

WIND TURBINE HAVING AIRFOILS FOR BLOCKING AND DIRECTING WIND AND ROTORS WITH OR WITHOUT A CENTRAL GAP

CROSS REFERENCE TO RELATED CASES

The present patent application is based upon and claims the benefit of U.S. Provisional Patent Application Ser. No. 60/467,773, filed on Apr. 30, 2003, entitled "Wind Turbine" by Ronald J. Taylor and Scott J. Taylor, which is hereby specifically incorporated herein by reference for all that it discloses and teaches.

BACKGROUND OF THE INVENTION a. Field of the Invention

The present invention pertains generally to wind turbines and more specifically to crossflow wind turbines having a plurality of stationary airfoils positioned about a rotor having a plurality of blades.

b. Description of the Background

Radial flow windmills that harness wind energy using a plurality of exposed blades have been used both privately and commercially for some time. These machines often have a high initial cost and have limited efficiency. Further, the exposed blades are hazardous to certain wildlife such as birds. In addition, radial windmills cannot normally be operated in very high wind conditions, as they often lack sufficient structural integrity and are not mechanically designed to prevent over-speeding.

Crossflow turbine wind machines, such as described in U.S. Pat. Nos. 6,015,258 to Taylor and U.S. Pat. No. 5,391,926 to Staley, et al., have been developed to address some of the limitations of the radial flow wind turbines. The crossflow turbine wind machine comprises a set of fixed stators that direct wind into a rotating turbine. One of the advantages to the crossflow turbine machine is the higher efficiencies that can be achieved, and they are less dangerous. Further, the structural integrity of the machine and the serviceability of the moving components are superior to that of a radial flow windmill.

SUMMARY OF THE INVENTION

The present invention overcomes the disadvantages and limitations of the prior art by providing a crossflow wind turbine that uses various airfoil and rotor configurations and orientations, including a rotor that has gaps near the leading edges and ground airfoils to increase efficiency.

The present invention may therefore comprise a crossflow wind turbine that generates mechanical energy from wind comprising: a rotor having a plurality of rotor blades that are symmetrically disposed around an axis, the rotor blades disposed in the rotor so that a gap is formed between leading edges of the rotor blades; a rotor space formed in a volume that is swept out by the rotor blades, the rotor space having a drive portion in which the rotors are driven by the wind and a return portion in which the rotors return to the drive portion; a plurality of airfoils that direct wind into the drive portion and direct wind away from the return portion to cause the rotor to turn and generate the mechanical energy.

The present invention may further comprise a method of generating mechanical energy from wind comprising: providing a crossflow wind turbine having airfoils and a rotor that sweeps out a rotor space, the rotor space having a drive portion and a return portion; symmetrically placing a plurality of rotor blades in the rotor that form a gap between leading edges of the rotor blades; placing the airfoils around the rotor to direct the wind into the drive portion of the rotor space so that the wind drives the rotor blades in the drive portion, and to block the wind from entering the return portion of the rotor space so that the rotor blades return to the drive portion to generate the mechanical energy.

The present invention may further comprise a crossflow wind turbine that generates mechanical energy from wind comprising: a rotor having a plurality of rotor blades that are symmetrically disposed around an axis, the rotor blades disposed in the rotor so that a gap is not formed between leading edges of the rotor blades; a rotor space formed in a volume that is swept out by the rotor blades, the rotor space having a drive portion in which the rotors are driven by the wind and a return portion in which the rotors return to the drive portion and a plurality of airfoils that direct wind into the drive portion and direct wind away from the return portion to cause the rotor to turn and generate the mechanical energy.

Advantages of various embodiments of the present invention include the ability to harness wind energy with an economical wind turbine that is safe and visually appealing.

DETAILED DESCRIPTION OF THE INVENTION

Figure 1:
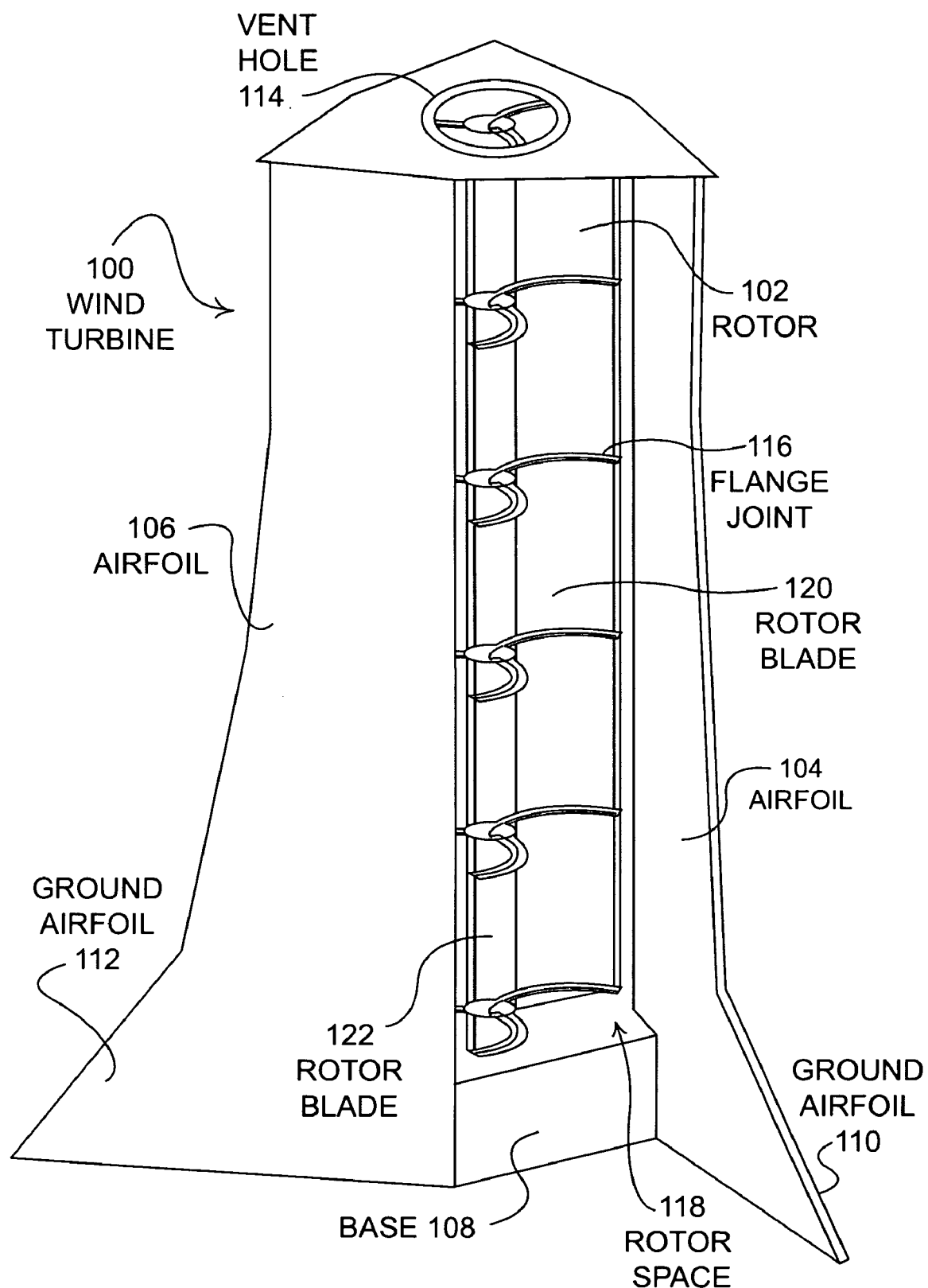
FIG. 1 is an illustration of a perspective view of one embodiment of the present invention of a wind turbine.

FIG. 1 is a perspective view of a first embodiment of a crossflow wind turbine 100. Crossflow wind turbines differ from propeller type (radial flow) turbines in that the wind generally flows across the axis of rotation in crossflow turbines, rather than generally along the axis of rotation in propeller type turbines. As shown in FIG. 1, a vertical rotor 102 is propelled by the wind and is mechanically coupled to an electrical generator located in the base 108. The rotor 102 is generally disposed with a vertical axis, but can have other orientations as desired. Three airfoils 104, 106, and one not visible behind the rotor 102, serve to support the upper portion of the rotor 102 and also to direct the wind into a drive portion of a rotor space 118 of the rotor 102 for increased efficiency and to block wind from a return portion of the rotor space 118. The rotor space 118 is the volume that is swept out by the rotor blades of rotor 102, such as rotor blades 120, 122, during the rotation of rotor 102. A ground airfoil portion 110 of airfoil 104 extends across the base 108, and functions to direct additional wind into the rotor 102. Airfoil 106 similarly has a ground airfoil 112. An optional vent hole 14 may be present in the top of the wind turbine.

The wind turbine 100 may be over 210 feet tall in some embodiments. The distance from the tip of the ground airfoil 110 to the tip of ground airfoil 112 may be over 200 feet in such embodiments. Such an embodiment may be suitable for a large wind farm application of a permanent power generation facility. In other embodiments, such as a portable wind turbine generator, the entire height of the turbine 100 may be only three or six feet. The general concepts embodied in the present invention are scalable to wind turbines of many different sizes, as is appreciated by those skilled in the arts.

The rotor 102 may be composed of several sections that are connected at joints such as the flange joint 116. Such embodiments may allow the rotor sections to be fabricated in sections that may be shipped to a wind turbine site for assembly. The rotor 102, in the embodiment of FIG. 1, is comprised of three blades. In some embodiments, the rotor blades may be individually manufactured and assembled in sections.

The rotor blades may be manufactured from a variety of materials, using a variety of methods. For example, the rotor blades may be fabricated from sheet metal, such as steel or aluminum, using fasteners or welded connections. In other embodiments, the rotor blades may be constructed of reinforced composite material using a variety of manufacturing techniques, including hand laid-up and autoclave cured fiberglass, or graphite composite, or any automated or semi-automated composite manufacturing technique desired. In still other embodiments, the rotor blades may be manufactured of molded or formed plastic. An advantage of lighter weight rotors is that less wind speed may be required to start the rotational motion of the rotor. In yet other embodiments, the rotor blades may be constructed with a sail cloth or another engineered fabric exterior over a structural frame. Carbon fiber may also be used. In fact, any suitable material or manufacturing technique may be used by those skilled in the arts while keeping within the spirit and intent of the present invention.

The airfoils, such as airfoil 104, may be manufactured by a variety of techniques. For example, the airfoil 104 may be a poured concrete slab that is lifted into place in a fashion similar to conventional 'tip up' building construction techniques. In such an example, the airfoils may be fabricated on-site and lifted into place. In another example, the airfoils may be continuously poured in a vertical manner using techniques common to the construction trade. In still other examples, the airfoils may be constructed of metal or other suitable material such as carbon fiber, fiberglass, etc. Some embodiments for airfoils may incorporate a rigid framework over which sail cloth is placed, or another engineered fabric or plastic type material, that forms an air-directing airfoil. Such a framework may be constructed of metal, concrete, or any other suitable material.

In some embodiments, the airfoils may be constructed of a combination of manufacturing techniques. For example, a steel column may support panels of concrete, sail cloth, metal, or other materials. In another example, a prestressed concrete post may have panels of various sorts attached thereto. Those skilled in the art may construct an embodiment of the present invention using any suitable materials while keeping within the spirit and intent of the present invention.

The base 108 may be used to house various components such as gearboxes, generators, control equipment and the like. The base 108 may be constructed above ground as shown or may be constructed below grade in other embodiments. In still other embodiments, the mechanical and electrical equipment for the wind turbine 100 may be located partially below grade. In embodiments with the base 108 above ground, the walls of the base 108 may be slanted to direct airflow into the rotor 102.

Figure 2:
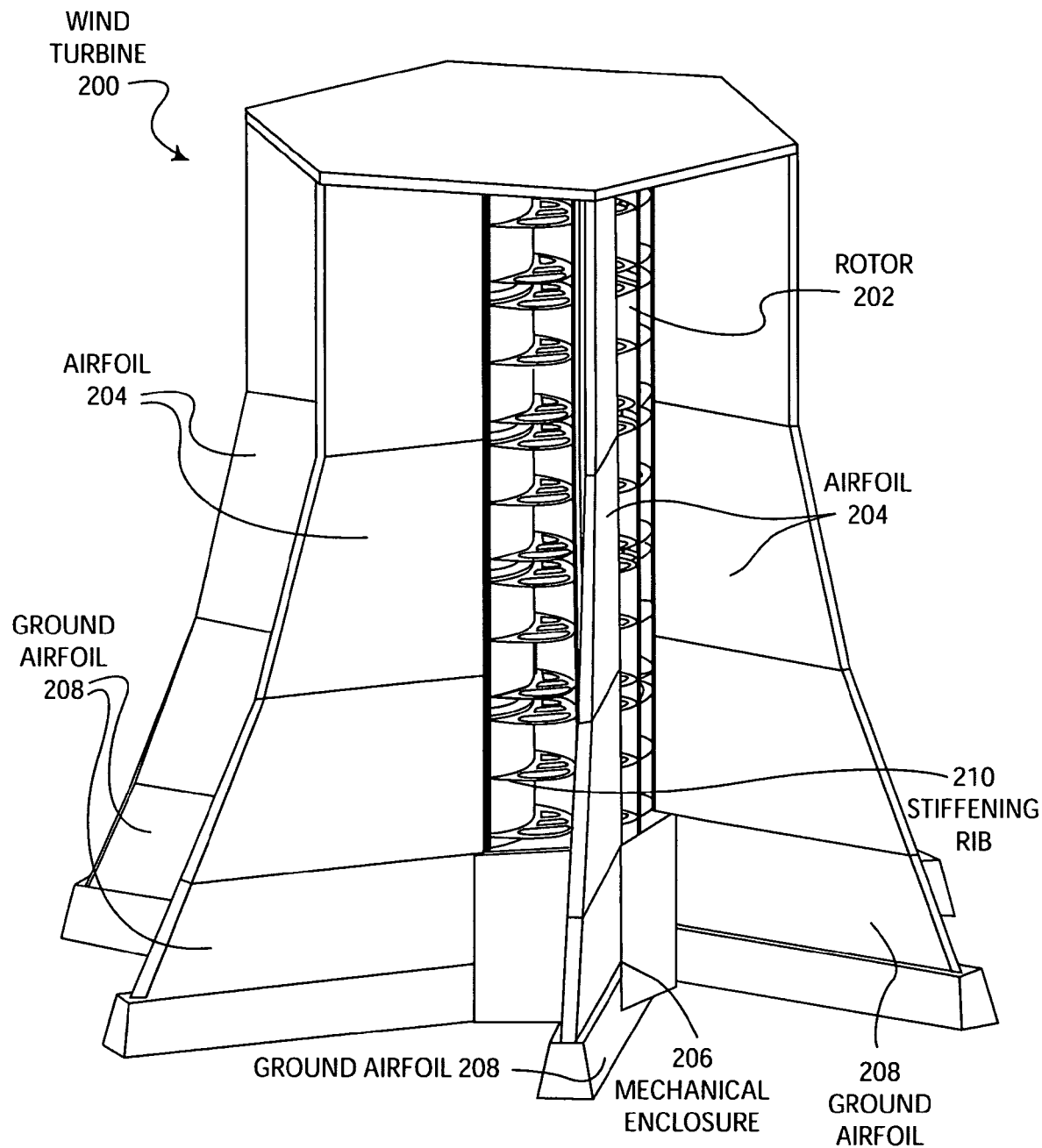
FIG. 2 is an illustration of a perspective view of another embodiment of the present invention of a wind turbine.

FIG. 2 illustrates a perspective view of another embodiment of a wind turbine 200. The rotor 202 comprises eight blades while six airfoils 204 support the rotor 202 and direct airflow into the rotor 202. A mechanical enclosure 206 may contain a generator and other electrical and mechanical equipment. The mechanical energy may be used directly in pumps or other mechanical devices including reverse osmosis desalination, or with generators/alternators that produce electrical energy that can be used for various purposes. The ground airfoils 208 may direct airflow into the drive portion of the rotor space.

The rotor 202 may contain a plurality of stiffening ribs 210 disposed between the various blades of the rotor 202. The ribs 210 may help disperse the loads seen by the blades of the rotor 202 during high wind conditions. In some embodiments, the rotor blades may be stiff enough to not require the ribs 210. In other embodiments, the ribs 210 may be used to lower the weight of the blades while giving the same overall structural integrity. Such tradeoffs may be made by those skilled in the arts in mechanical and structural design.

Figure 3:
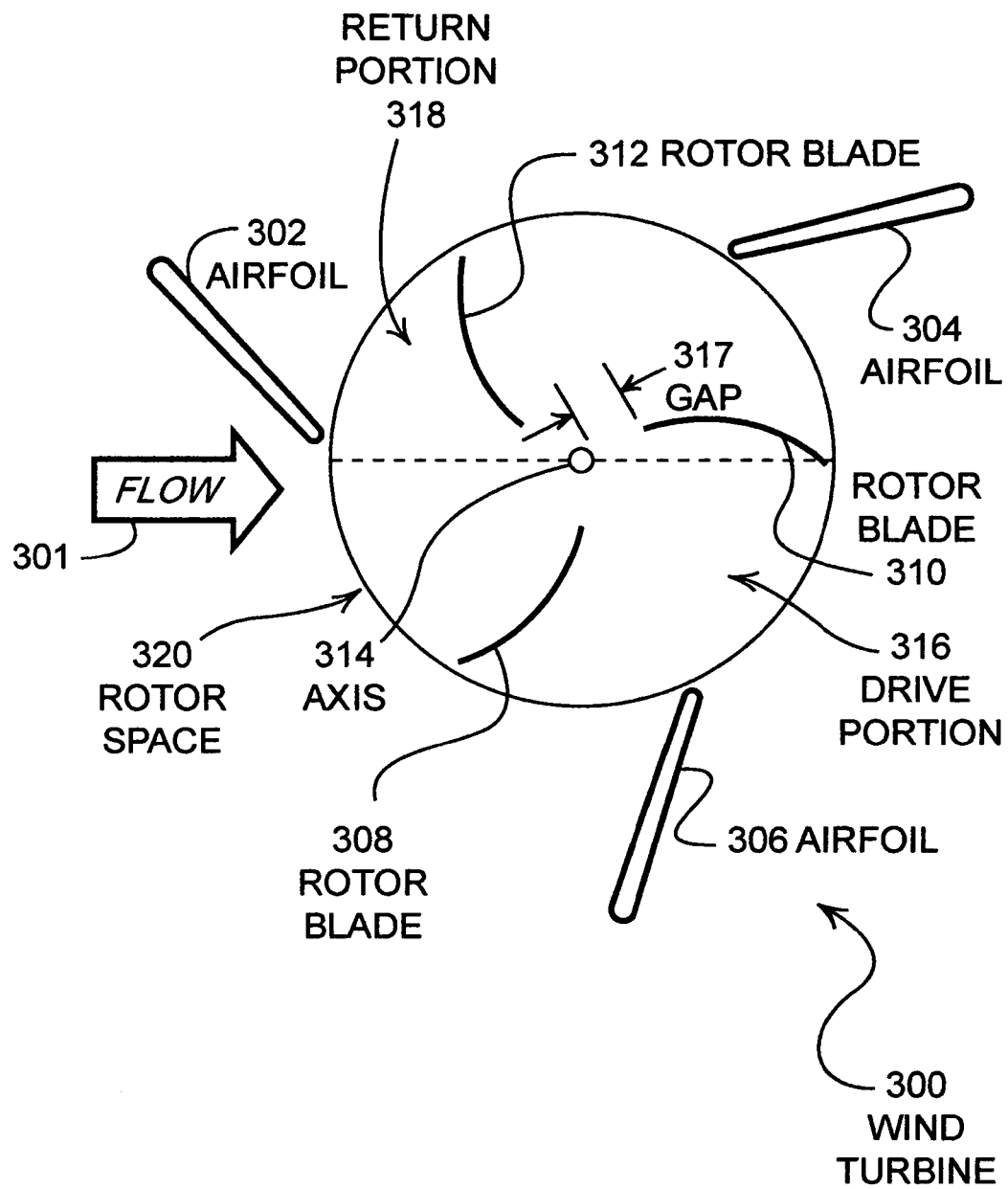
FIG. 3 is an illustration of a cross-sectional view of another embodiment of the present invention of a wind turbine.

FIG. 3 illustrates a cross-sectional view of an embodiment of a wind turbine 300. The incoming airflow is represented by arrow 301 which shows wind blowing from the left. Airfoils 302, 304, and 306 are symmetrically disposed about the embodiment 300. Three rotor blades 308, 310, and 312 have a slight curve. A center axis shaft 314 is present in the embodiment 300 that may be used to support the rotor blades 308, 310 and 312 along the length of the rotor blades. A gap 317 is also present between the leading edge of each blade. The gap 317 has been shown through computational fluid dynamics models to reduce the drag on the rotor and thereby increase efficiency under certain conditions. Different configurations of rotor blades that are shown in the various embodiments disclosed below can be used with the airfoil configuration of FIG. 3 and other airfoil configurations disclosed herein. Similarly, the various airfoil configurations disclosed herein can be used with the various rotor configurations to achieve desired results.

As also shown in FIG. 3, the rotor blades 308, 310, 312 sweep out a volume that is generally shown by the circle 320 which is the rotor space. The rotor space has two different portions, a drive portion 316 and a return portion 318. The drive portion 316 is the portion of the rotor space 320 in which the rotor blades are driven by the wind flowing from direction 301. The return portion 318 is the portion where the rotor blades return to the drive portion 316. As shown in FIG. 3, airfoil 302 blocks wind flowing from direction 301 from substantially entering the return portion 318. In addition, airfoil 302 directs wind into the drive portion 316. Airfoil 306 also directs wind into the drive portion 316. The drive portion 316 may vary in accordance with the magnitude of the flow 301, i.e., the magnitude of the wind speed. For example, high wind flowing from direction 301 may be guided by airfoil 306 so that the drive portion 316 extends into part of the return portion 318 at the right side of the rotor space 320 where the rotor blade 310 is disposed. In other words, the division between the drive portion 316 and the return portion 318 may not be exactly as shown in FIG. 3 or any of the figures and may vary in accordance with the wind speed. Further, the direction of flow 301 to the wind may greatly affect the operability and efficiency of the device of FIG. 3. As shown in FIG. 3, the wind flow 301 is from the 9 o'clock position and is able to produce high efficiency because the wind flow 301 is guided by airfoil 302 into the drive portion 316 and away from the return portion 318. Similar efficiencies occur when the wind comes from the 1 o'clock position and the 5 o'clock position. Of course, as the direction of the flow 301 changes, the drive portion and the return portion of the rotor space 320 also change.

As set forth above, a gap 317 is formed between the leading edges of each of the rotor blades 308, 310, 312. As shown in FIG. 3, the leading edges of the rotor blades 308, 310 and 312 are not overlapping. The curvature of the rotor blade 308, 310, 312 functions to assist in capturing wind flowing from direction 301 in the drive portion 316 and reducing resistance in the return portion 318. The curvature of the rotor blades 308, 310, 312 also causes wind to flow across the surface of the rotor blades, such as rotor blade 308, and direct wind into the return portion 318 to drive another rotor blade, such as rotor blade 310. This process further increases the efficiency of the embodiment of FIG. 3. Hence, the gaps cause the wind to flow across the rotor blades through the gap and into the return portion 318 for the purpose of driving additional rotor blades in the return portion 318, which increases efficiencies under certain conditions.

Figure 4:
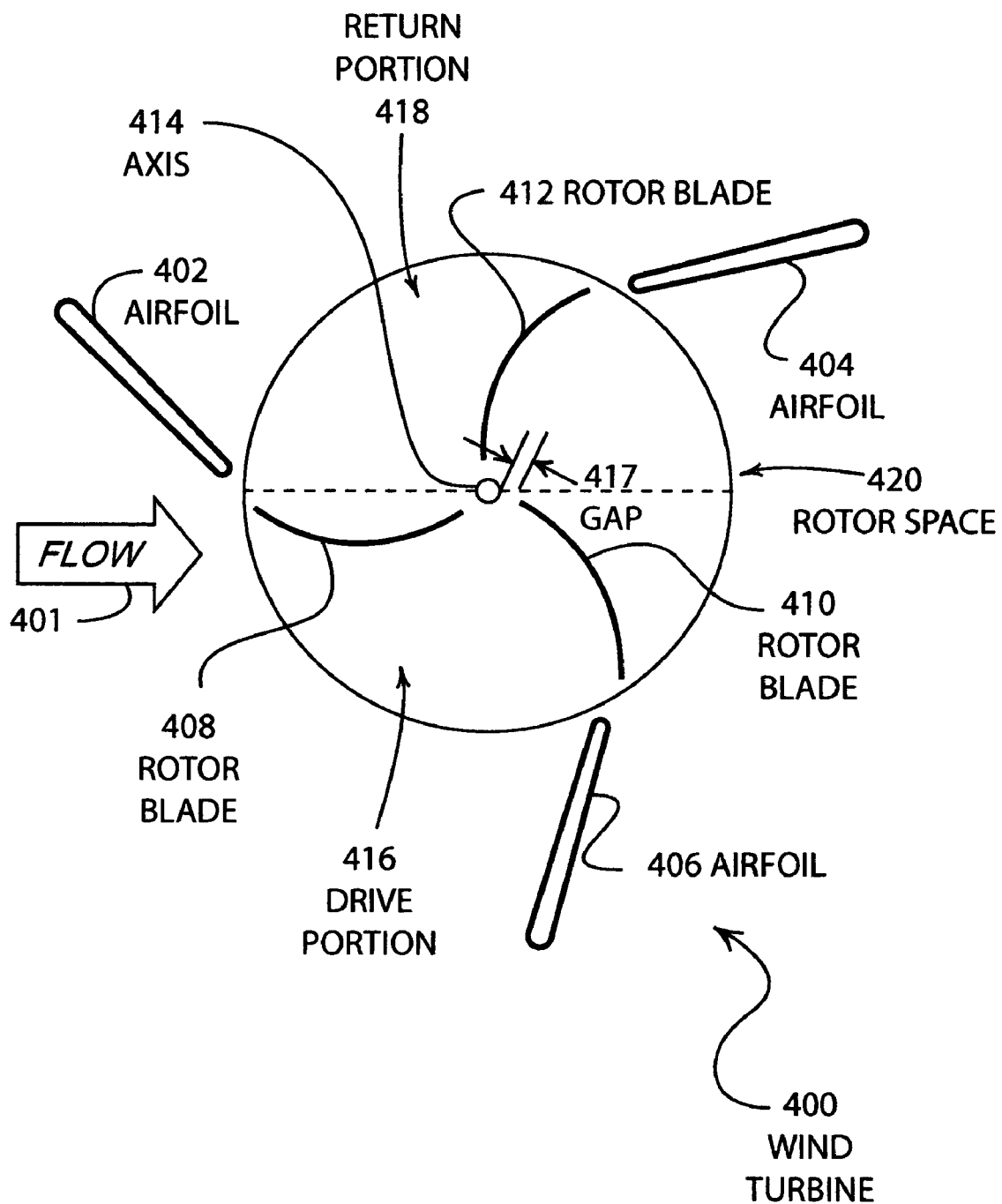
FIG. 4 is an illustration of a cross-sectional view of another embodiment of the present invention of a wind turbine.

FIG. 4 illustrates a cross-sectional view of another embodiment of a wind turbine 400 that is similar to the embodiment of FIG. 3, but has smaller gaps between the leading edges of the rotor blades 408, 410 and 412. The incoming airflow is represented by arrow 401 from the left side of FIG. 3. Airfoils 402, 404, and 406 are also symmetrically disposed about the embodiment 400. Three rotor blades 408, 410, and 412 also have a slight curve. A center axis shaft 414 is present in the embodiment 400. A gap 417 is present between the leading edge of each of the rotor blades 408, 410, 412. The gap 417 is smaller than the gap 317 of embodiment 300, which provides higher efficiencies in some conditions. The gap 417 increases the performance of the wind turbine 400 under some conditions for the same reasons as set forth above in the explanation of the embodiment of FIG. 3. The size of the gap in the position of the rotor blades 408, 410, 412 with respect to the other blades and the axis 414 controls the manner in which the wind flows across the rotor blade and is directed from the drive portion 416 into the return portion 418 of the rotor space 420. As such, the efficiency in operation of the device is affected by these matters. As shown in FIG. 4, the rotor blades are capable of directing wind from the drive portion 416 into the return portion 418 to drive other rotor blades in the return portion 418 through the gap 417. Again, FIG. 4 shows the leading edges of the rotor blades 408, 410, 412 as non-overlapping rotor blades.

Figure 5:
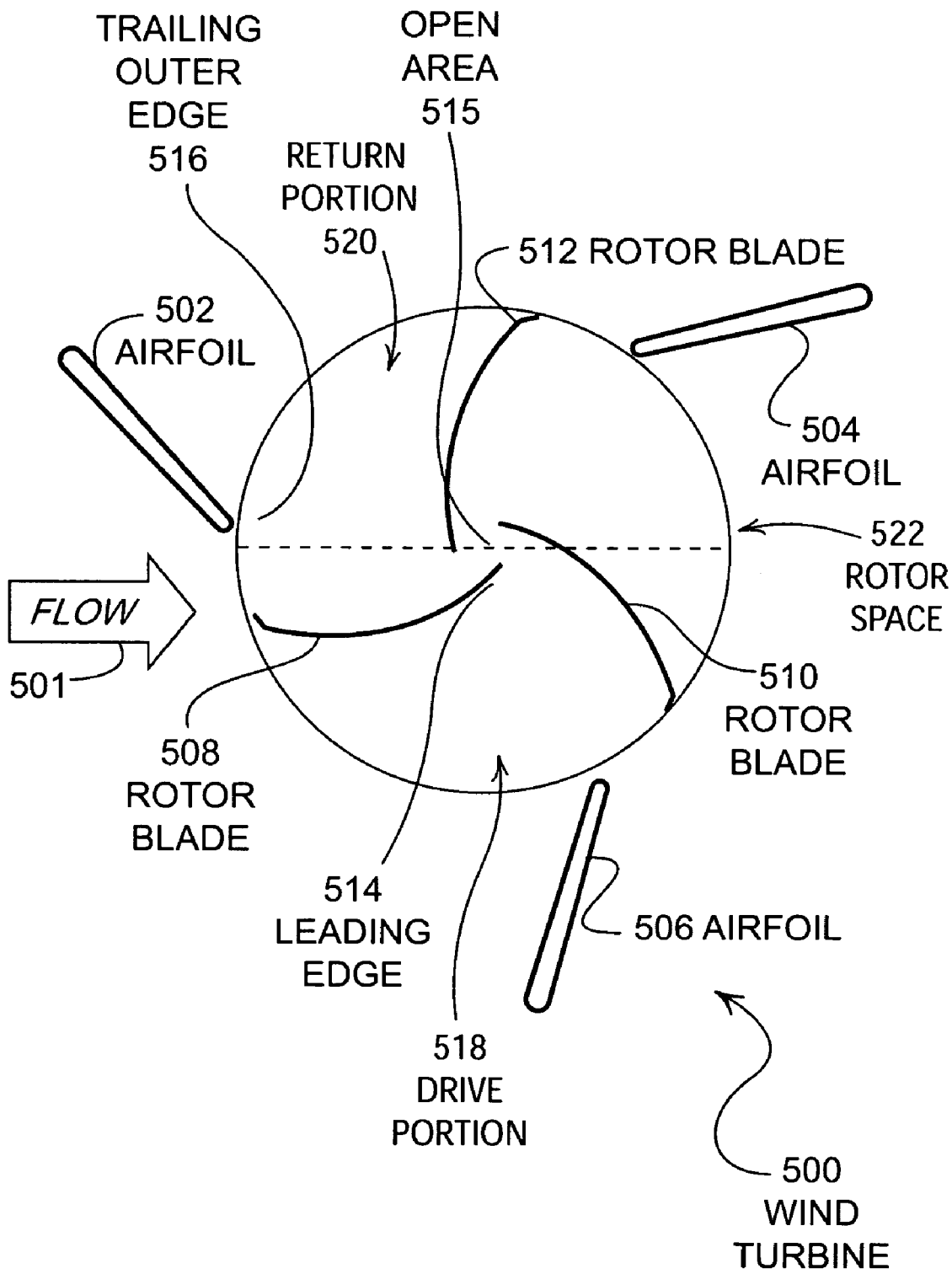
FIG. 5 is an illustration of a cross-sectional view of another embodiment of the present invention of a wind turbine.

FIG. 5 illustrates a cross-sectional view of another embodiment of a wind turbine 500. The incoming airflow is represented by arrow 501 from the left. Airfoils 502, 504, and 506 are symmetrically disposed about the embodiment 500. Three rotor blades 508, 510, and 512 have a slight curve. The rotor blades are supported at the ends so that no center axis shaft is necessary in embodiment 500. The leading edges of the rotor blades 508, 510, 512 form a gap around the axis of rotation. As shown in FIG. 5, the rotor blades are overlapping. The overlapping blades function to further channel the flow of wind across the rotor blade and onto the surface of another rotor blade. This process functions to further increase the efficiency of the device under certain conditions by creating multiple driving surfaces formed from multiple rotor blades. For example, wind captured by rotor blade 508 may flow across the surface of rotor blade 508 and be directed onto the surface of rotor blade 510 so as to drive multiple rotor blades. Airfoil 502 directs wind away from the return portion 520 and into the drive portion 518 of the rotor space 522. The trailing edge 516 of the rotor blade 508 has an angled fin to further assist in capturing wind.

Figure 6:
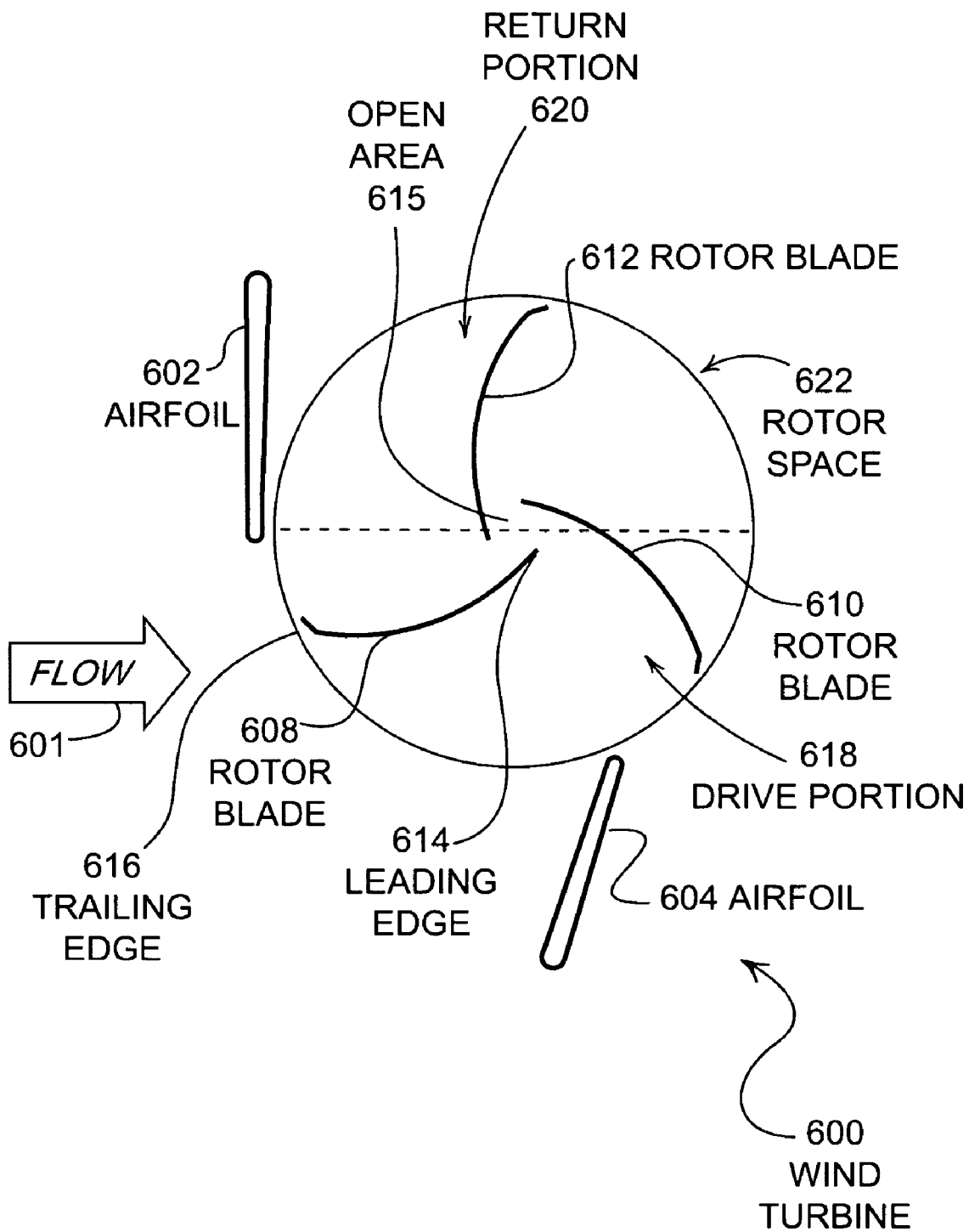
FIG. 6 is an illustration of a cross-sectional view of another embodiment of the present invention of a wind turbine.

FIG. 6 is a cross-sectional view of another embodiment of a wind turbine 600. The incoming airflow is represented by arrow 601 from the left side of FIG. 6. Airfoils 602 and 604 are asymmetrically disposed about the embodiment 600. Airfoil 602 blocks the wind from the return portion 620 of rotor space 622. Airfoil 604 guides the wind into the drive portion 618 of the rotor space 622. Three rotor blades 608, 610, and 612 have a slight curve and are overlapping in a fashion similar to rotor blades 508, 510, 512 of FIG. 5. As such, rotor blades 608, 610, 612 operate in a fashion similar to rotor blades 508, 510, 512. No center axis shaft is present in embodiment 600, and the rotor blades 608, 610, 612 can be supported in various ways such as top and bottom plates. The gap formed between the leading edges provides increased efficiencies for the same reasons as set forth above. The trailing edge 616 of the rotor blade 608 has an angled fin which further aids in capturing wind and holding the wind as the wind falls off of the rotor blades during rotation of the rotor blades through the drive portion 618.

The asymmetrical design of the embodiment 600 may be beneficial in locations where the wind is predominately from one direction, which is often the case in locations of high wind. Such embodiments may have the benefit of lower costs, since fewer structural components may be needed to construct the wind turbine. Further, the asymmetric nature of the wind turbine may be optimized for increased performance in the direction of the prevailing wind.

Figure 7:
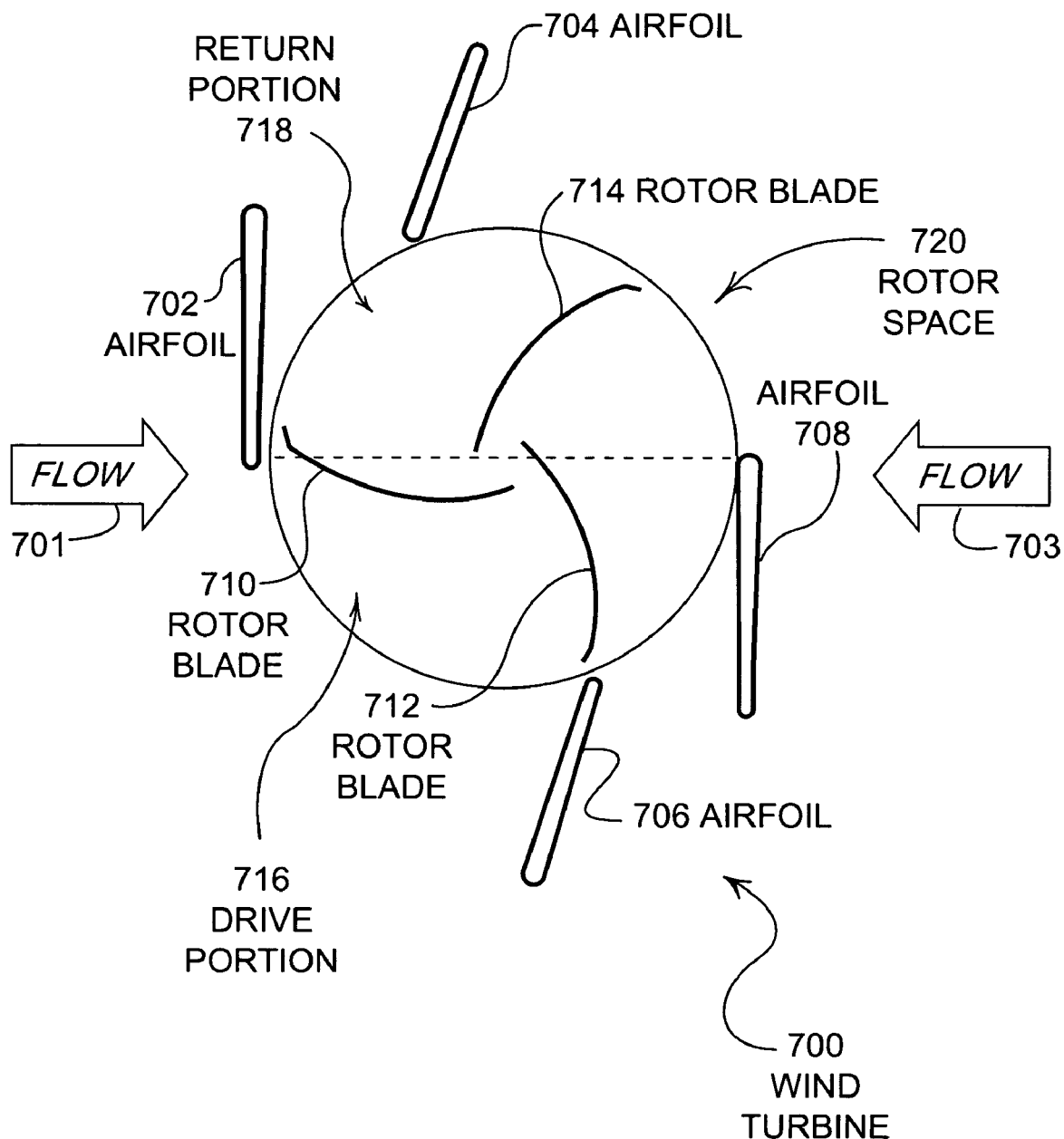
FIG. 7 is an illustration of a cross-sectional view of another embodiment of the present invention of a wind turbine.

FIG. 7 illustrates a cross-sectional view of another embodiment of a wind turbine 700. The incoming airflow is represented by arrow 701 from the left side of FIG. 7. Airfoils 702, 704, 706, and 708 are disposed symmetrically on two sides of the rotor space 720. Three rotor blades 710, 712, and 714 are similar in design to those of embodiment 600.

Airfoils 702, 704, 706, 708 are disposed in a symmetric design that is capable of capturing wind from two opposing directions. Airfoils 702, 704, 706, 708 are arranged in a manner that provides optimized performance from wind flowing from direction 701 as well as wind flowing from the opposite direction 703. In many locations with high prevailing wind, the wind direction may often be from a primary direction 701. In such locations, the secondary direction is often opposite from the primary direction 701. The embodiment 700 may take advantage of such a phenomena by being oriented to perform at maximum efficiency in the two main wind directions. As shown in FIG. 7, airfoil 702 blocks wind flowing from direction 701 from entering the return portion 718 of the rotor space 720. Airfoil 706 assists in guiding wind flowing from direction 701 into the drive portion 716. Similarly, airfoil 708 blocks wind flowing from direction 703 from the drive portion 716, which becomes the return portion. Airfoil 704 guides wind flowing from direction 703 into the return portion 718, which becomes the drive portion of the rotor space 720.

Figure 8:
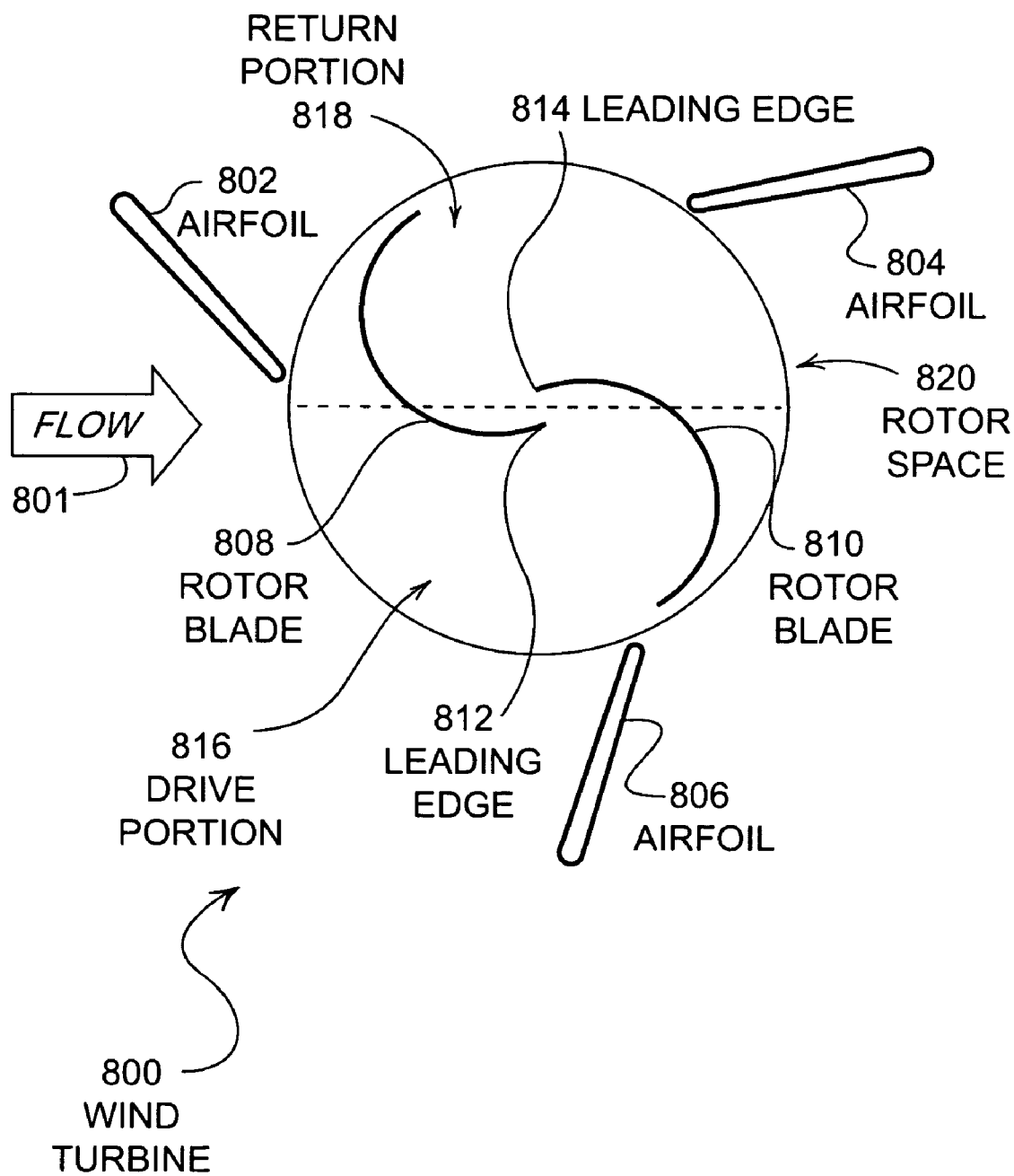
FIG. 8 is an illustration of a cross-sectional view of another embodiment of the present invention of a wind turbine.

FIG. 8 illustrates a cross-sectional view of another embodiment of a wind turbine 800. The incoming airflow is represented by arrow 801 from the left side of FIG. 8. Airfoils 802, 804, and 806 are symmetrically disposed about the rotor space 820. Two rotor blades 808 and 810 are barrel-shaped and are separated at the center by a gap between leading edges 812 and 814. The leading edges are not overlapping. The shape of the rotor blades 808, 810 together with the gap provided between the leading edges 812, 814, respectively, allows wind to be channeled from one rotor blade to another. In other words, when a rotor blade is in a position to catch the wind flowing from direction 801 in the drive portion 816, the wind will move along the surface of the rotor blade and be transferred to the other rotor blade through the gap between the leading edges 812, 814. In this fashion, driving forces can be generated in both the drive portion 816 and return portion 818 of the rotor space 820.

The embodiment 800 illustrates the use of two rotor blades and three airfoils. Many different combinations of rotor blades and airfoils may be used while keeping within the spirit and intent of the present invention. Further, the embodiment 800 illustrates the use of different shapes of rotor blades. The rotor blades 808 and 810 are shown as lines. However, in practice the blades 808 and 810 will have some thickness and shape such as an airfoil design. Those skilled in the arts will appreciate that a line may represent the general shape of an airfoil design. However, the rotor blade may require some thickness for structural integrity and the thickness may be constructed in an aerodynamic airfoil shape to further enhance efficiency of the wind turbine.

Figure 9:
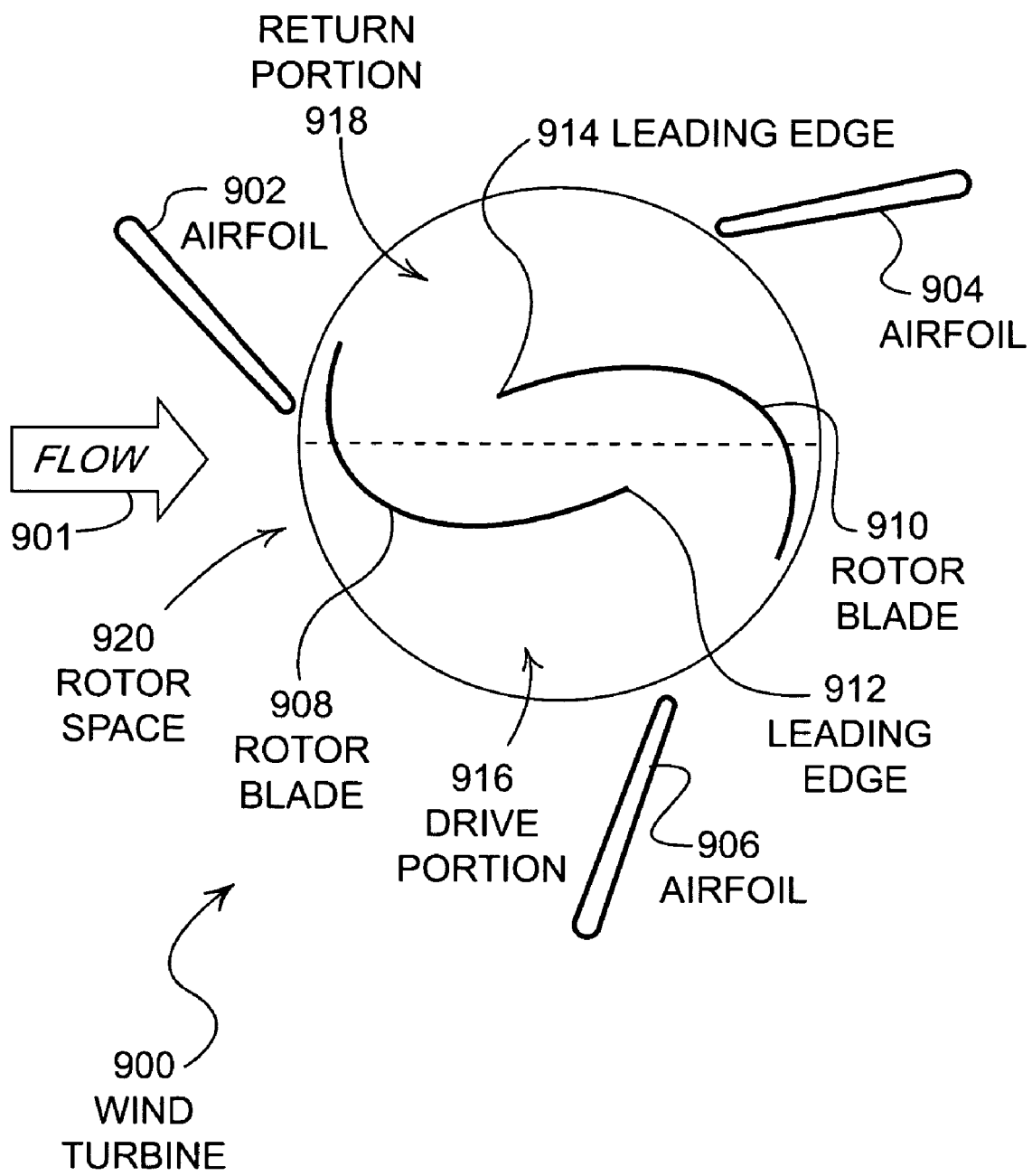
FIG. 9 is an illustration of a cross-sectional view of another embodiment of the present invention of a wind turbine.

FIG. 9 illustrates a cross-sectional view of another embodiment of a wind turbine 900. The incoming airflow is represented by arrow 901 from the left side of FIG. 9. Airfoils 902, 904, and 906 are symmetrically disposed about the embodiment 900. Two rotor blades 908 and 910 are barrel-shaped and are separated at the center by a gap between leading edges 912 and 914. The rotor blades 908, 910 are shaped to provide a large overlapping area between the rotor blades. This allows wind flowing from direction 901 to be easily transferred from one rotor blade in the drive portion 916 to another rotor blade in return portion 918 of the rotor space 920. Again, this design provides driving forces in both the drive portion 916 and the return portion 918.

Figure 10:
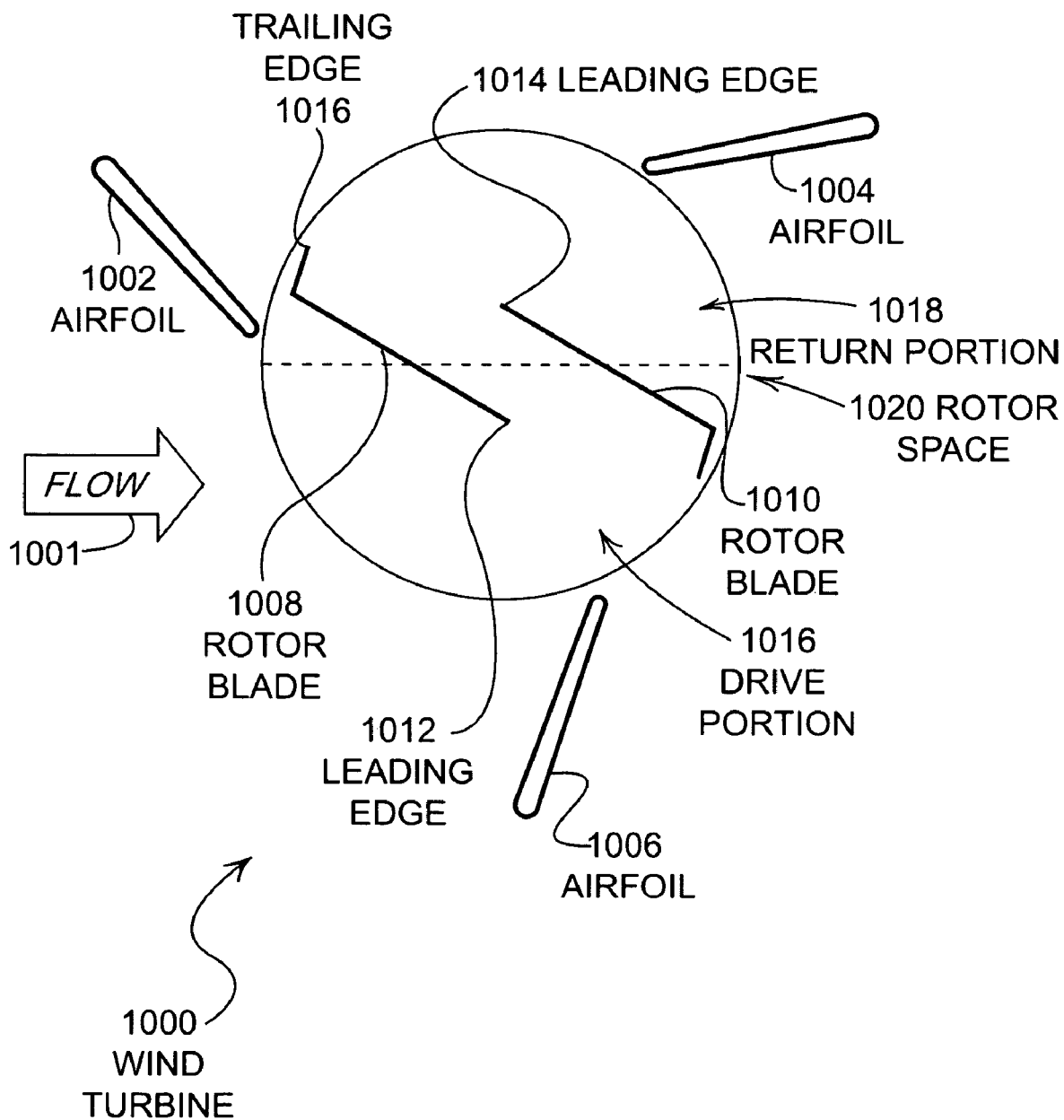
FIG. 10 is an illustration of a cross-sectional view of another embodiment of the present invention of a wind turbine.

FIG. 10 illustrates a cross-sectional view of another embodiment of a wind turbine 1000. The incoming airflow is represented by arrow 1001 from the left side of FIG. 10. Airfoils 1002, 1004, and 1006 are symmetrically disposed about the embodiment 1000. Two rotor blades 1008 and 1010 are straight and are separated at the center by a gap between leading edges 1012 and 1014. Wind flowing from direction 1001 drives the rotor blade in the drive portion 1016 and transfers wind to the other rotor blade in the return portion 1018 of the rotor space 1020. The trailing edge 1016 has a large fin that catches exiting wind.

Figure 11:
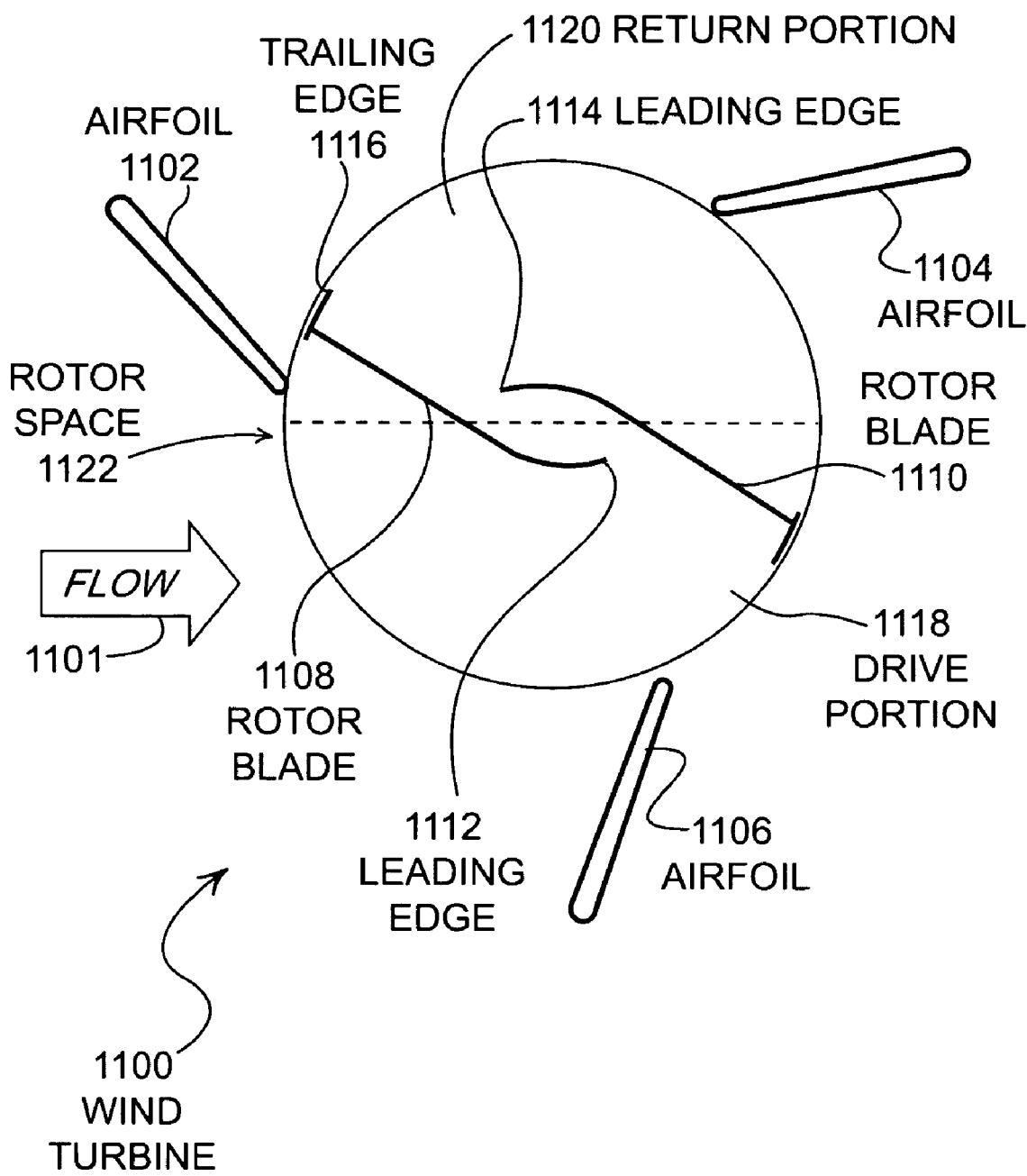
FIG. 11 is an illustration of a cross-sectional view of another embodiment of the present invention of a wind turbine.

FIG. 11 illustrates a cross-sectional view of another embodiment of a wind turbine 1100. The incoming airflow is represented by arrow 1101 from the left side of FIG. 11. Airfoils 1102, 1104, and 1106 are symmetrically disposed about the embodiment 1100. Two rotor blades 1108 and 1110 are substantially straight with a curved portion near the leading edges 1012 and 1014. The trailing edge 1116 has a large fin. Again, wind flowing from the direction 1101 drives the rotor blade in the drive portion 1118 and transfers wind to the other rotor blade in the return portion 1120 of the rotor space 1022. The large fins at the end help to catch wind and drive the rotor blades.

Figure 12:
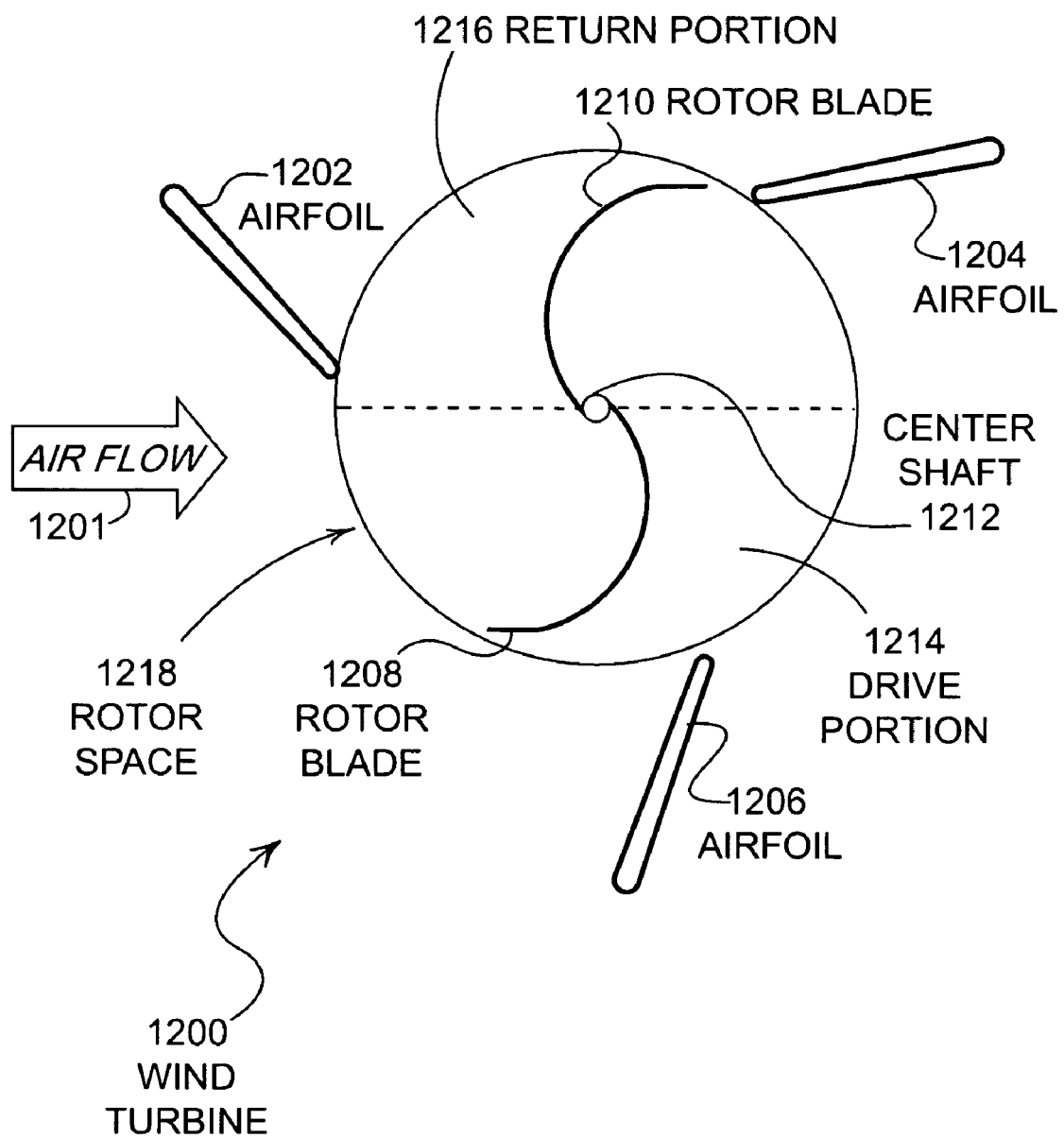
FIG. 12 is an illustration of a cross-sectional view of another embodiment of the present invention of a wind turbine.

FIG. 12 illustrates a cross-sectional view of another embodiment of a wind turbine 1200 that does not have gaps and that has increased efficiency. The incoming airflow is represented by arrow 1201 from the left side of FIG. 12. Airfoils 1202, 1204, and 1206 are symmetrically disposed about the embodiment 1200. Two rotor blades 1208 and 1210 are curved and join at the center axis shaft 1212 so that no gap is formed. In this manner, air is trapped by the rotor blades and continues to force the rotor blade around its axis, rather than being exhausted through a gap. This increases efficiencies under certain conditions. Air flowing from direction 1201 is substantially blocked from entering the return portion 1216 by airfoil 1202. This allows the rotor blade 1210 to return in the return portion 1216 with minimal force from the airflow 1201. Rotor blade 1208 is driven by the wind in the drive portion 1214 of the rotor space 1218 as described above.

Figure 13:
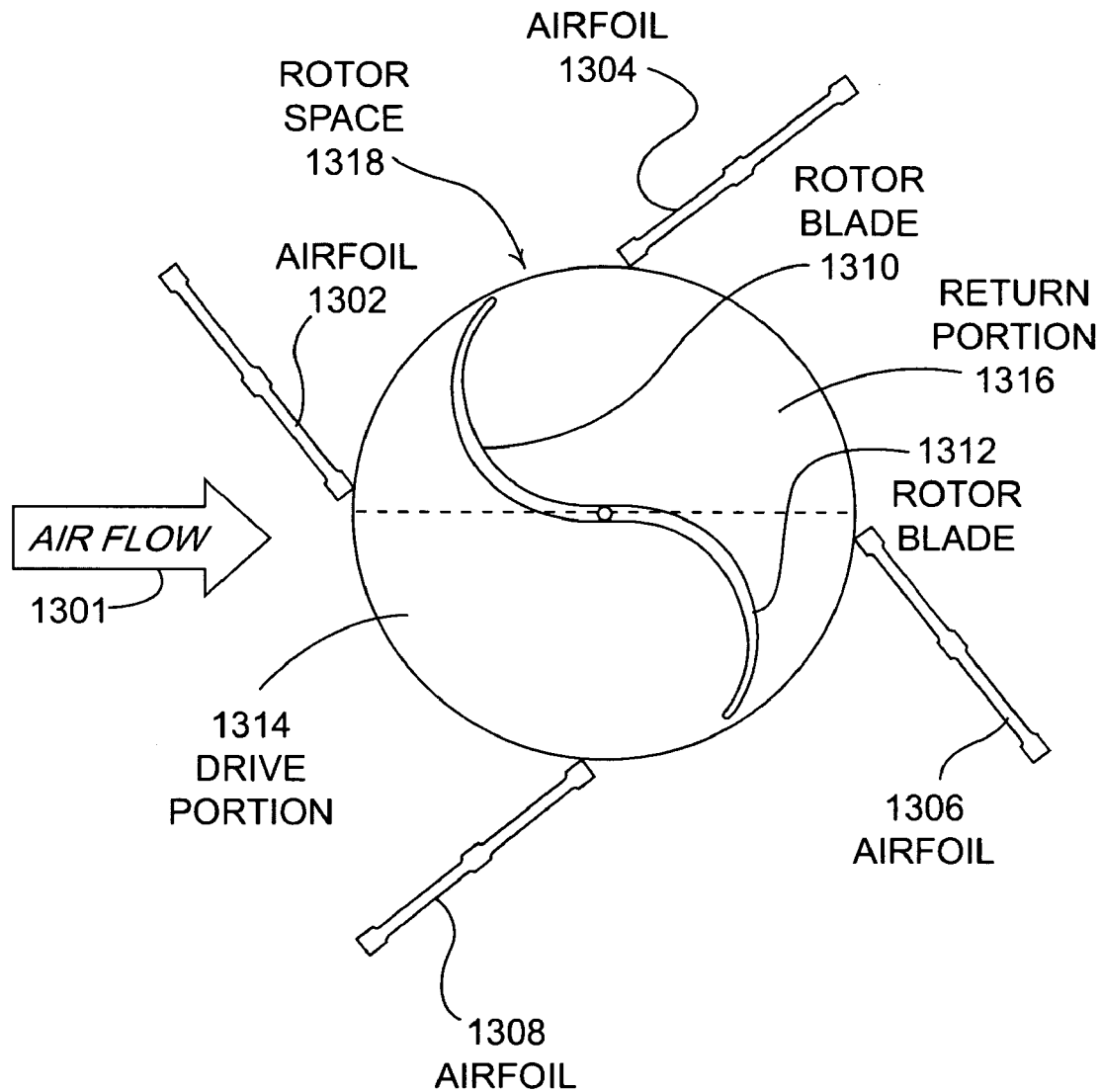
FIG. 13 is an illustration of a cross-sectional view of another embodiment of the present invention of a wind turbine.

FIG. 13 illustrates a cross-sectional view of another embodiment of a wind turbine 1300. The incoming airflow is represented by arrow 1301 from the left side of FIG. 13 that also does not have a central gap. Airfoils 1302, 1304, 1306, and 1308 are symmetrically disposed about the embodiment 1300. Two rotor blades 1310 and 1312 are curved and are joined at the center in the same manner as the embodiment of FIG. 12, which results in increased efficiencies for the same reasons as set forth above. As shown in FIG. 13, airfoil 1302 blocks the wind from entering the return portion 1316 while airfoil 1308 directs the airflow into the drive portion 1314 of the rotor space 1318. When the wind flows from the opposite direction, airfoil 1306 performs the same function as airfoil 1302, while airfoil 1304 performs the same function as airfoil 1308. Similarly, wind can flow from the top of FIG. 13, or the bottom of FIG. 13, and the airfoils operate in substantially the same fashion. In this manner, the device of FIG. 13 can operate with wind coming primarily from four different directions.

The present invention therefore provides a unique system of both blocking wind in a return portion of a rotor space and directing wind to rotor blades in a drive portion of a rotor space. Various configurations of airfoils and rotors can be used to achieve these results. A gap formed between leading edges of rotor blades can function to allow wind to flow across the rotor blades in a drive portion and be channeled through a gap between the leading edges and into a return portion of the rotor space to drive another rotor blade. This channeling of the wind through the central gaps allows multiple rotor blades to be driven by wind coming from a single direction. Other embodiments do not provide a central gap, which increases efficiencies in certain conditions.

While certain embodiments are specifically adapted to operate with wind coming primarily from a predetermined direction, other embodiments are arranged to operate efficiently with wind coming from two or more directions. In this manner, the particular airfoil and rotor design for any particular environment can be achieved based upon prevailing winds in the area. In addition, airfoils can be used near the bottom portion of a vertically oriented wind turbine to direct ground winds or low winds up into the wind turbine in an efficient manner.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A crossflow wind turbine that generates mechanical energy from wind comprising:
    a rotor having a plurality of rotor blades that are symmetrically disposed around an axis, said rotor blades disposed in said rotor so that a gap is formed between leading edges of said rotor blades;
    a rotor space formed in a volume that is swept out by said rotor blades, said rotor space having a drive portion in which said rotor blades are driven by said wind and a return portion in which said rotor blades return to said drive portion;
    a plurality of airfoils that direct wind into said drive portion and direct wind away from said return portion to cause said rotor to turn and generate said mechanical energy, said airfoils being placed non-symmetrically around said rotor to provide a substantially bidirectional crossflow turbine.

2. The crossflow turbine of claim 1 wherein said rotor blades are disposed in said rotor so that said leading edges are spaced apart from and overlap said axis of said rotor to form said gap.

3. The crossflow turbine of claim 2 wherein said rotor blades are disposed in said rotor so that said wind flows across said rotor blades in said drive portion, through said gap, and into said return portion of said rotor space.

4. The crossflow turbine of claim 1 wherein said rotor blades are disposed in said rotor so that said leading edges are spaced apart from and are substantially even with said axis to form said gap.

5. The crossflow turbine of claim 4 wherein said rotor blades are disposed in said rotor so that said wind flows across said rotor blades in said drive portion, through said gap, and into said return portion of said rotor space.

6. The crossflow turbine of claim 1 wherein said axis is vertical and said airfoils extend at least partially over a base so that said base and said airfoils capture wind along lower portions of said crossflow turbine and direct winds from said lower portion of said crossflow turbine.

7. A method of generating mechanical energy from wind comprising:
    providing a crossflow wind turbine having airfoils and a rotor that sweeps out a rotor space, said rotor space having a drive portion and a return portion;
    symmetrically placing a plurality of rotor blades in said rotor that form a gap between leading edges of said rotor blades;
    placing said airfoils non-symmetrically around said rotor to provide a substantially bidirectional crossflow turbine by substantially directing said wind into said drive portion of said rotor space so that said wind drives said rotor blades in said drive portion, and by substantially blocking said wind from entering said return portion of said rotor space so that said rotor blades return to said drive portion to generate said mechanical energy.

8. The method of claim 7 wherein said step of symmetrically placing a plurality of rotor blades in said rotor further comprises:
    placing said plurality of rotor blades in said rotor so that said leading edges are spaced apart from and overlap an axis of rotation of said rotor to form said gap.

9. The method of claim 7 wherein said step of symmetrically placing a plurality of rotor blades in said rotor further comprises:
    placing said plurality of rotor blades in said rotor so that said leading edges are spaced apart from and are substantially even with an axis of rotation of said rotor to form said gap.

10. The method of claim 7 wherein said step of placing said airfoils around said rotor further comprises:
    placing at least one airfoil in a position to block said wind from entering said second portion whenever said wind flows substantially from at least one predetermined direction, and placing at least one other airfoil in a position to direct said wind into said first portion whenever said wind is flowing substantially from said at least one predetermined direction.

11. The method of claim 7 wherein:
    providing a crossflow turbine comprises providing a vertical crossflow turbine; and,
    placing said airfoils comprises placing said airfoils so that said airfoils at least partially extend over a base to form an airfoil so that said utility enclosure and said airfoils direct wind from lower portions of said crossflow turbine into said crossflow turbine.

12. The crossflow turbine of claim 7 wherein symmetrically placing said plurality of rotor blades in said rotor that form a gap comprises symmetrically placing said plurality of rotor blades in said rotor to form a gap so that said wind flows across said rotor blades in said drive portion, through said gap, and into said return portion of said rotor space.

13. A crossflow wind turbine that generates mechanical energy from wind comprising:
    a rotor having a plurality of rotor blades that are symmetrically disposed around an axis, said rotor blades disposed in said rotor so that a gap is not formed between leading edges of said rotor blades;
    a rotor space formed in a volume that is swept out by said rotor blades, said rotor space having a drive portion in which said rotor blades are driven by said wind and a return portion in which said rotor blades return to said drive portion;
    a plurality of airfoils that direct wind into said drive portion and direct wind away from said return portion to cause said rotor to turn and generate said mechanical energy, said airfoils being placed nonsymmetrically around said rotor to provide a substantially bidirectional crossflow turbine.

14. The crossflow turbine of claim 13 wherein said axis is vertical and said airfoils extend at least partially over a base so that said base and said airfoils capture wind along lower portions of said crossflow turbine and direct winds from said lower portion of said crossflow turbine.

15. A method of generating mechanical energy from wind comprising:
providing a crossflow wind turbine having airfoils and a rotor that sweeps out a rotor space, said rotor space having a drive portion and a return portion;
symmetrically placing a plurality of rotor blades in said rotor that do not form a gap between leading edges of said rotor blades;
placing said airfoils nonsymmetrically around said rotor to provide a substantially bidirectional crossflow turbine by substantially directing said wind into said drive portion of said rotor space so that said wind drives said rotor blades in said drive portion, and by substantially blocking said wind from entering said return portion of said rotor space so that said rotor blades return to said drive portion to generate said mechanical energy.

16. The method of claim 15 wherein:
providing a crossflow turbine comprises providing a vertical crossflow turbine; and,
placing said airfoils comprises placing said airfoils so that said airfoils at least partially extend over a base to form ground airfoil so that said utility enclosure and said airfoils direct wind from lower portions of said crossflow turbine into said crossflow turbine.

* * * * *